(12) United States Patent
Zamprogna et al.

(10) Patent No.: US 9,060,534 B2
(45) Date of Patent: Jun. 23, 2015

(54) METHOD FOR DRYING RICE

(75) Inventors: Eliana Zamprogna, Winterthur (CH); Urs Keller, Seuzach (CH)

(73) Assignee: Bühler AG, Uzwil (CH)

( * ) Notice: Subject to any disclaimer, the term of this patent is extended or adjusted under 35 U.S.C. 154(b) by 0 days.

(21) Appl. No.: 13/266,045

(22) PCT Filed: Apr. 26, 2010

(86) PCT No.: PCT/EP2010/055539
§ 371 (c)(1),
(2), (4) Date: Dec. 9, 2011

(87) PCT Pub. No.: WO2010/122166
PCT Pub. Date: Oct. 28, 2010

(65) Prior Publication Data
US 2012/0076916 A1    Mar. 29, 2012

Related U.S. Application Data

(60) Provisional application No. 61/172,306, filed on Apr. 24, 2009.

(30) Foreign Application Priority Data

Apr. 24, 2009   (CH) .......................... 657/09

(51) Int. Cl.
*A23L 1/182* (2006.01)
*A23B 9/08* (2006.01)
*A23L 1/01* (2006.01)

(52) U.S. Cl.
CPC . *A23L 1/182* (2013.01); *A23B 9/08* (2013.01); *A23L 1/0121* (2013.01)

(58) Field of Classification Search
CPC ............. A23B 9/02; A23B 9/08; A23L 1/182
USPC ......................................... 426/618, 460, 465
See application file for complete search history.

(56) References Cited

U.S. PATENT DOCUMENTS

| 4,361,593 A | 11/1982 | Brooks et al. |
| 4,479,309 A | 10/1984 | Tolson |
| 2012/0167408 A1 | 7/2012 | Siebenmorgen et al. |

FOREIGN PATENT DOCUMENTS

| DE | 10208182 | 8/2003 |
| DE | 102005061288 | 6/2007 |

(Continued)

OTHER PUBLICATIONS

Cnossen, A. G. Glass Transition Temperature Concepts, 2002, American Society of Agriculure Engineers, vol. 45(3):759-766.*

(Continued)

*Primary Examiner* — Helen F Heggestad
(74) *Attorney, Agent, or Firm* — Davis & Bujold, P.L.L.C.; Michael J. Bujold

(57) ABSTRACT

The invention relates to a method for drying rice, in which, during the drying process, the grains of rice pass through surface states which have various pairs of values of temperature (T) of the surface and moisture (U) of the surface, the surface of the grains of rice remaining in a viscoelastic state during the drying process, and in which, in a diagram comprising temperature (T) of the surface of the grains of rice and moisture (U) of the surface, a) the temperature (Tv) of the surface of the grains of rice lies no more than 40° C. above the temperature (Tg) on the glass transition curve of the rice at the point of the same moisture of the surface and/or b) the moisture (Uv) of the surface of the grains of rice lies no more than 20% above the moisture on the glass transition curve of the rice at the point of the same temperature of the surface.

18 Claims, 1 Drawing Sheet

(56) References Cited

FOREIGN PATENT DOCUMENTS

| | | |
|---|---|---|
| DE | 102005038990 | 7/2007 |
| EP | 2060191 | 5/2009 |
| WO | 2005/017431 | 2/2005 |
| WO | 20051017431 | 2/2005 |
| WO | 2007/065279 | 6/2007 |
| WO | 20071065279 | 6/2007 |
| WO | 2009/150192 | 12/2009 |
| WO | 20091150192 | 12/2009 |

OTHER PUBLICATIONS

Yang et al., "Relationship of moisture content gradients and the glass transition . . . ".

Cnossen et al., "Rice Fissuring Responde to High Drying and Tempering Temperatures".

Yang et al., "Relationship of Kernel Moisture Content Gradients and Glass Transition . . . ".

Thakur et al., Two Stage Drying of High Moisture Paddy with . . . .

Iguaz et al., "Influence of handling and processing of rough . . . ".

Torgul et al., "Moisture Sorption Isotherms and Thermodynamic . . . ".

Dong et al., "Moisture Distribution in a Rice Kernel During . . . ".

Yang et al., "Relationship of moisture content gradients and the glass transition . . . ", Biosystems Engineering (2003) 86 (2), pp. 199-206, Elsevier Ltd.

Cnossen et al., "Rice Fissuring Responde to High Drying and Tempering Temperatures", Journal of Food Engineering 59 (2003), pp. 61-69, Elsevier Ltd.

Yang et al., "Relationship of Kernel Moisture Content Gradients and Glass Transition . . . ", Biosystems Engineering (2003) 85 (4), pp. 467-476, Elsevier Ltd.

Thakur et al., Two Stage Drying of High Moisture Paddy with . . . , Energy Conversion and Management 47 (2006), pp. 3069-3083, Elsevier Ltd.

Iguaz et al., "Influence of handling and processing of rough . . . ", Journal of Food Engineering 77 (2006), pp. 803-809, Elsevier Ltd.

Togrul et al., "Moisture Sorption Isotherms and Thermodynamic . . . ", Journal of Stored Products Research 43 (2007), pp. 252-264, Elsevier Ltd.

Dong et al., "Moisture Distribution in a Rice Kernel During . . . ", Journal of Food Engineering 91 (2009), pp. 126-132, Elsevier Ltd.

\* cited by examiner

METHOD FOR DRYING RICE

This application claims benefit of provisional application 61/172,306, filed Apr. 24, 2009.

BACKGROUND OF THE INVENTION

The invention relates to a method and a device for drying rice, in particular paddy rice.

When drying rice, care needs to be taken that the grains of rice experience as little degradation as possible, for example cracking and/or excessive discolorations, during the drying process.

Excessively strong and rapid drying at high temperature, low relative air humidity and strong air circulation (high drying power) causes shrinkage stresses which generally lead to cracks or splits in the grains of rice during or after their drying. The rice dried in this way then readily disintegrates into individual pieces during milling.

Furthermore, "aggressive" drying of this type promotes Maillard reactions on the grains of rice during their drying, which leads to the aforementioned discolorations.

In addition, the drying times hitherto achieved for the drying of rice are still unsatisfactorily long.

SUMMARY OF THE INVENTION

It is an object of the invention to avoid the disadvantages of the prior art and in particular produce dried rice of the highest quality, in particular without undesired cracks and excessive discolorations, in as short a time as possible, in particular with a markedly shortened drying process. This object is achieved according to the independent patent claims.

The method according to the invention comprises the step of drying rice, the drying conditions being selected so that at least during a fraction of the time of the total duration of the drying process, at least one subregion of the surface, preferably the entire surface, of a grain of rice remains in a viscoelastic state. In this way, it is not only possible to reduce the extent of shrinkage stresses and Maillard reactions during the drying process, so that the dry rice produced in this way has no cracks and no discoloration, but also a significant shortening of the duration of the drying process is achieved.

A viscoelastic state is also referred to as a rubber-like, viscoelastic or plastic state.

This method thus has the advantage that the drying time is reduced and/or the so-called head rice yield is increased. The head rice yield is economically relevant since rice which cannot be classified as head rice loses great financial value, specifically up to 70%.

A Maillard reaction is intended to mean a so-called nonenzymatic browning reaction, i.e. in particular a discoloration reaction. For example, a Maillard reaction can lead to a yellow-red discoloration of the rice, which is disadvantageous since the value of rice depends in particular on its white color.

Head rice in the context of the present application is intended to mean a grain of rice which still has at least ¾ of the original length of the grain of rice, expressed in terms of the longest dimension of the grain of rice, after the rice production, in particular the cleaning and/or hulling of rice.

Expediently, at least one subregion of the surface, preferably the entire surface, passes through various temperature/moisture states, in particular with an increase of the surface temperature and a decrease of the surface moisture.

In this case, the various temperature/moisture states of the surface are preferably selected so that they lie above the glass transition temperature in a viscoelastic state. Here in particular, in a diagram of temperature and moisture of the surface, a) the surface temperature should not lie more than 40° C. above the temperature on the glass transition curve at the point of equal surface moisture, and/or b) the surface moisture should not lie more than 20% above the moisture on the glass transition curve at the point of equal surface temperature. The temperature/moisture states of the surface of the rice accordingly always lie within a maximum bandwidth above the glass transition curve.

The glass transition temperature is intended here to mean the temperature at which a material exhibits the greatest change of deformability. Below the glass transition temperature, the material behaves in a brittle fashion, and above the glass transition temperature it behaves viscoelastically. The viscoelasticity is characterized by a partly elastic and partly viscous behavior. The material relaxes only incompletely after removal of the external force, and the remaining energy is released in the form of flow processes (retardation). The term glass transition temperature used here refers to the rice as a whole, and not to individual microscopic constituents thereof.

When the moisture, i.e. the water content, of rice decreases, its glass transition temperature increases. If, then, the glass transition temperature is measured for rice with different moistures and these are plotted in a temperature/moisture diagram, a glass transition curve is obtained for the rice.

If the air surrounding a grain of rice has a different temperature and/or moisture to the grain of rice, then an equilibrium temperature and moisture are set up on the surface of the grain of rice. This equilibrium temperature and moisture of the surface can be adjusted so that the drying time is minimized. This minimization is achieved by seeking the lowest possible equilibrium moisture of the rice surface as rapidly as possible. This is done by appropriate selection of the drying air temperature and moisture with the condition that the surface remains in the viscoelastic state, i.e. in particular is not embrittled.

Preferably, a glass transition curve in a temperature/moisture diagram (T/U diagram) of the rice is provided for the method. The glass transition curve is in this case measured by means of known measurement methods such as DMTA (dynamic mechanical thermal analysis); measurement by means of DSC (differential scanning calorimetry) is also possible. What is important in this case is that the measurement as far as possible reflects the deformability of the entire grain of rice and not just individual microscopic constituents, for which reason measurement by means of DMTA is preferred.

Preferably, the equilibrium moisture U on the surface of the grain of rice is monitored during the drying.

It is particularly advantageous for the temperature/moisture value pairs of the surface of the grain of rice to be adjusted during the drying so as not to cross below the glass transition curve, in a diagram of surface temperature and surface moisture, into the vitreous range.

It is particularly advantageous for (only) the equilibrium moisture U on the surface of the grain of rice to be monitored during the drying. This is the moisture on the surface of the grain of rice. This surface moisture is imparted to the grains of rice by the drying climate surrounding them and forms one of the boundary conditions (gas temperature, water vapor partial pressure) for the moisture gradient set up inside the grain of rice during the drying. The moistures U are specified as (mass of the water in the product)/(total mass of the product containing water).

The drying climate is preferably an air atmosphere having a defined air temperature and defined relative humidity. If required, it is also possible to operate with other gases, in particular oxygen-free or low-oxygen inert gases, as a drying climate. The gases are advantageously nitrogen or carbon dioxide and mixtures consisting thereof with a defined partial pressure or mole fraction of water vapor contained therein.

The rice is preferably harvested rice, i.e. paddy rice, which typically has a moisture content of 17-25% wb before drying. If required, it is also possible to dry parboiled rice, which typically has a moisture content of 25% wb-35% wb before drying.

The viscoelastic state (T; U) which occurs during drying of the rice, with a temperature T and a moisture U, should have a minimum distance $\Delta U_{MIN}=U-U_g$ from a state at the glass transition $(T_g; U_g)$ of the rice, parallel to the moisture axis U (wt % water/total weight) of the temperature/moisture diagram.

During the drying, "the glass transition curve is ridden along" in the T/U diagram. Surprisingly, it has been found that it is thereby possible to achieve short drying times with little energy expenditure and without impairment of the product properties mentioned in the introduction.

This may be done by continuous control or regulation of the drying conditions. Control or regulation of the drying conditions may also be carried out in steps, for example by stepwise control or regulation of the temperature and/or the moisture.

The minimum distance preferably lies in the range $0.5\%<\Delta U_{MIN}<5\%$, more preferably in the range $1\%<\Delta U_{MIN}<3.5\%$ and most preferably in the range $1.5\%<\Delta U_{MIN}<2.5\%$. This ensures a safety margin from the glass transition curve in the temperature/moisture diagram (T/U), crossing of which into the glass state should be prevented at least during a fraction of the duration of the drying process. If required, at the appropriate time during the drying, controlled and time-limited crossing into the glass state may optionally be permitted.

The viscoelastic state (T; U) which occurs during drying of the rice, with a temperature T and a moisture U, should have a minimum distance $\Delta T_{MIN}=T-T_g$ from a state at the glass transition $(T_g; U_g)$, parallel to the temperature axis T (kelvin) of the temperature/moisture diagram.

The minimum distance preferably lies in the range $1 K<T_{MIN}<10$ K, and more preferably in the range $1 K<\Delta T_{MIN}<5$ K. This also ensures a safety margin from the glass transition curve in the temperature/moisture diagram (T/U), crossing of which into the glass state should be prevented at least during a fraction of the duration of the drying process, although if required at the appropriate time during the drying, controlled and time-limited crossing into the glass transition may optionally be permitted.

The viscoelastic state (T; U) which occurs during drying of the rice, with a temperature T and a moisture U, should not exceed a maximum distance $\Delta U_{MAX}=U-U_g$ from a state at the glass transition $(T_g; U_g)$, parallel to the moisture axis U (wt % water/total weight) of the temperature/moisture diagram.

The maximum distance preferably lies in the range $5\%<\Delta U_{MAX}<20\%$, and more preferably in the range $5\%<\Delta U_{MAX}<10\%$.

The viscoelastic state (T; U) which occurs during drying of the rice, with a temperature T and a moisture U, should not exceed a maximum distance $\Delta T_{Max}=T-T_g$ from a state at the glass transition $(T_g; U_g)$, parallel to the temperature axis T (kelvin).

The maximum distance preferably lies in the range $10K<\Delta T_{Max}<40$ K, and more preferably in the range $10K<\Delta T_{Max}<30$ K.

The glass transition curve in the temperature/moisture diagram (T/U diagram) of the rice is preferably provided by measurements on samples of the rice before and/or during the drying. The samplings and measurements necessary for this may be carried out online or offline. In this case, on the samples, moistures and/or temperatures are determined which are the homogeneous moisture or homogeneous temperature throughout the volume of the sample taken, after the gradients of moisture and temperature inside the sample have relaxed at the sampling time.

As an alternative or in addition, the required glass transition curve in the temperature/moisture diagram (T/U diagram) of the rice in question may be provided from a library in which glass transition data and data concerning the moisture content in equilibrium with the surrounding air are provided.

The glass transitions in the samples may be determined by DSC measurements or DMTA measurements familiar to the person skilled in the art.

Preferably, during at least a part of the drying process, the relative humidity of the drying environment and/or the temperature of the drying environment of the rice are controlled or regulated so that a glass transition from the viscoelastic state to the vitreous state is prevented at least in subregions of the surface of the rice. In the regions in which the rice to be dried is not in the vitreous state, water molecules can diffuse more rapidly (about 5 to 10 times more rapidly) so that the removal of water and therefore the drying of the grains of rice take place more rapidly overall. Ideally, the transition to the glass range is in this case prevented by controlling the relative humidity of the drying climate at each temperature during the drying process.

It is particularly advantageous for transition to the glass range to be prevented for the grains of rice by controlling the relative humidity and/or the temperature of the drying climate throughout the drying process. Preferably, it is prevented for at least 90% and more preferably at least 95% of the total duration of the drying process. This should be the case for at least 80% of the total surface of the grains of rice. It is particularly advantageous for the subsurface not existing in the vitreous state to be at least 90% and more preferably at least 95% of the total surface of the grain of rice.

Expediently, the relative humidity of the drying climate is kept below 98%, preferably 95%, more preferably 92% and most preferably below 90%. This reduces the risk of condensation effects, which can lead to undesired clumping of the rice during the drying process. Furthermore, it positively influences inter alia the drying kinetics.

Expediently, a majority of the volume, preferably the entire volume, or at least the entire surface of the grain of rice is in a viscoelastic state beyond the glass transition of the rice during the drying. It is particularly preferable in this case for the rice to have a viscoelastic state beyond the glass transition throughout the duration of the drying process. The glass transition to the vitreous state should preferably be crossed below only at the end of the drying process during rapid cooling of the dried rice to ambient temperature.

Expediently, the temperature T is kept below 150° C. and preferably below 120° C. during the drying. This will prevent Maillard reactions in the grains of rice and therefore excessive discolorations during the drying.

Expediently, the total duration $t_{TOT}$ of the drying is kept less than 300 min, more preferably less than 240 min, more preferably less than 200 min and preferentially less than 180 min. Even with a total duration $t_{TOT}$ of less than 120 min, good results are possible. This is sufficient in the method according to the invention for complete drying from an initial moisture content before drying to a final moisture content after drying, and it permits energy-saving drying.

In a particularly advantageous embodiment of the method according to the invention, the time integral of the temperature profile as a function of time T(t) (in ° C.) over the total drying time $t_{TOT}$ is less than $20\times10^3$ min ° C. and preferably less than $15\times10^3$ min ° C. This also contributes to the prevention of drying-induced discolorations and makes it possible to keep the drying energy outlay low and nevertheless to avoid crossing below the glass transition into the vitreous state during the drying.

If the surface state of the rice briefly (a few seconds to a few minutes) crosses below the glass transition into the vitreous state, this is the less important, the earlier this takes place in the drying process. In particular, brief crossing below the glass transition during transfer of the rice to the drying stage is inconsequential.

During the drying process, the grains of rice may be moved relative to one another and/or kept separated relative to one another.

Ideally, in the invention, both the surface and the interior of the grains of rice as far as the center remain in the viscoelastic i.e. non-vitreous state throughout the drying process. The effect of this is that the moisture transport from the interior or center of the grain of rice to its surface, and from its surface into the surrounding drying air, takes place rapidly. This achieves a higher drying rate, or more rapid drying saturation. Since no glass transition takes place, there is no risk of cracking in the grains of rice.

The surface and the interior, or the center, of the grains of rice reach the moisture content in equilibrium with the surrounding air during the drying.

The object mentioned in the introduction is therefore furthermore achieved by a device having the features of the independent device claim.

A device according to the invention for drying rice according to a method as described above comprises at least one temperature sensor and at least one moisture sensor for determining the temperature and the moisture of the drying climate.

Preferably, the at least one temperature sensor and moisture sensor are assigned a control unit or regulating unit which is programmed or programmable so as to permit drying rice according to a method as described above.

It is particularly advantageous when a library, in which glass transition data and rice data, in particular glass transition data of rice, particularly preferably data concerning the moisture content in equilibrium with the surrounding air, are provided, is connected or connectable to the control unit or the regulating unit.

The drying means is preferably assigned a control unit or regulating unit by which the moisture and the temperature of a drying climate can be controlled or regulated.

The drying means preferably comprises a device for determining a glass transition of the rice.

The control unit or the regulating unit for controlling or regulating the drying climate is preferably assigned a library, in which glass transition data and/or data concerning the moisture content in equilibrium with the surrounding air are provided.

The invention furthermore relates to a method for operating a device as described above, the device being controlled or regulated so that during intended use of the device for drying rice, a total duration $t_{TOT}$ of the drying process of less than 300 min, preferably less than 240 min, particularly preferably less than 200 min is achieved and more particularly preferably less than 180 min. Particularly preferably, a total duration $t_{TOT}$ of the drying process of less than 120 min is achieved.

BRIEF DESCRIPTION OF THE DRAWINGS

Other advantages, features and possible applications of the invention may be found in the following examples with the aid of Tables 1 and 2 and FIGS. 1 and 2, wherein.

DESCRIPTION OF THE PREFERRED EMBODIMENTS

Table 1 shows drying conditions which may be applied in a drying device according to the invention.

Table 1:

TABLE 1

Figure 1:
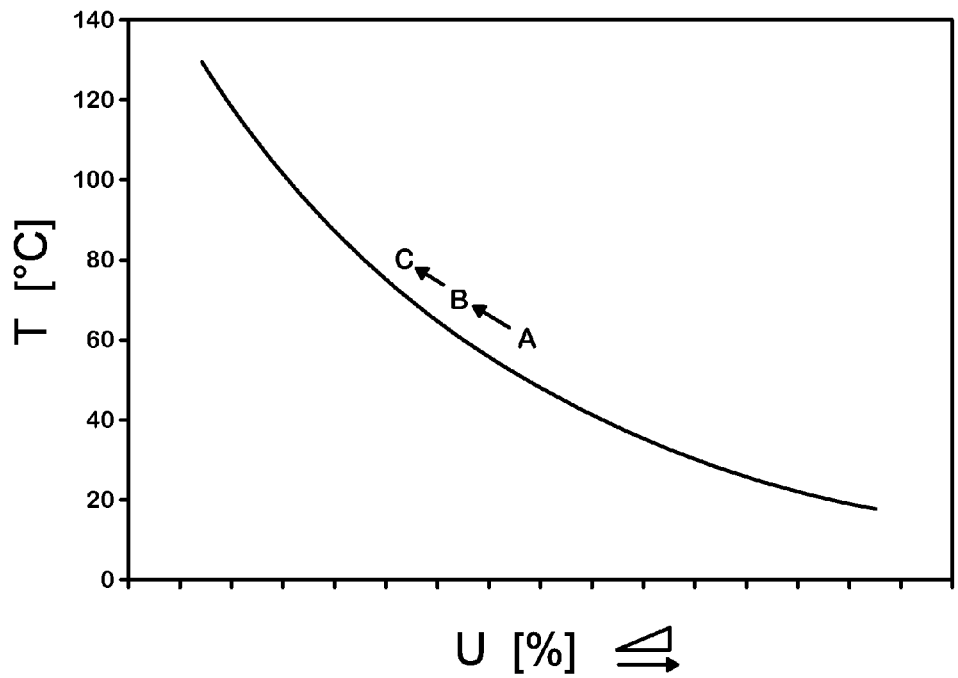
FIG. 1 is a temperature/moisture diagram of a glass transition curve according to Table 1.

| Surface state of the grains of rice | T [° C.] | RH [%] | t [min] | State in the T/U diagram according to FIG. 1 |
|---|---|---|---|---|
| viscoelastic | 60 | 75 | 60 | A |
| viscoelastic | 70 | 75 | 60 | B |
| viscoelastic | 80 | 75 | 60 | C |

The grains of rice referred to in this example were harvested with a water content of 20 g/100 g of total weight (20% wb). The rice was transferred into the drying device, in which the drying was carried out by means of convective drying with conditioned air. The water content of the rice after the drying was about 12% wb. The conditions of this drying air (temperature T and relative humidity RH) were applied according to the setpoint values indicated in Table 1 over the entire drying time of 180 min. The total drying time is the sum of the residence times t (see 4$^{th}$ column of the table) in a respective climate (T/RH combination, see column 2 and column 3 of the table).

Table 2 shows alternative drying conditions which may be applied in a drying device according to the invention.

Table 2:

TABLE 2

Figure 2:
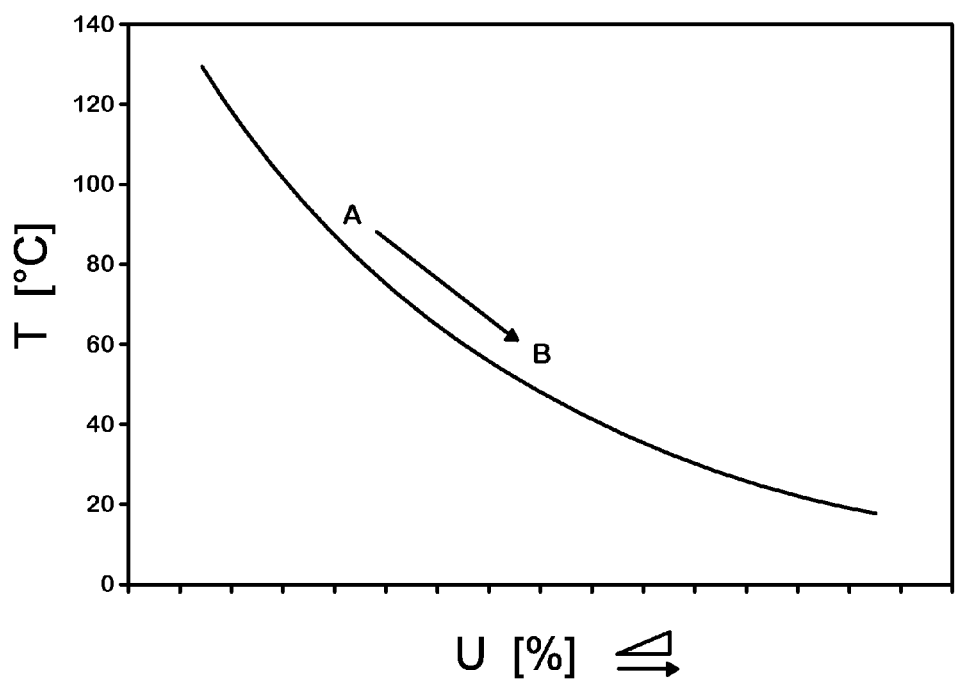
FIG. 2 is a diagram of an alternative glass transition curve according to Table 2.

| Surface state of the grains of rice | T [° C.] | RH [%] | t [min] | State in the T/U diagram according to FIG. 2 |
|---|---|---|---|---|
| viscoelastic | 90 | 75 | 60 | A |
| viscoelastic | 60 | 75 | 60 | B |

The grains of rice referred to in this example were harvested with a water content of 20 g/100 g of total weight (20% wb). The rice was transferred into the drying device, in which the drying was carried out by means of convective drying with conditioned air. The water content of the rice after the drying was about 12% wb. The conditions of this drying air (temperature T and relative humidity RH) were applied according to the setpoint values indicated in Table 2 over the entire drying time of 120 min. FIG. 1 represents by way of example a glass transition curve in a temperature/moisture diagram according to Table 1. FIG. 2 represents an alternative method according to the invention according to Table 2.

In FIG. 1, the temperature T of the surface of the grain of rice is plotted against the equilibrium moisture U of the surface of the grain of rice, indicated in percent by weight expressed in terms of the total weight of the grain of rice. With increasing moisture, the glass transition temperature decreases. In the method according to the invention, grains of rice are brought into a state A at a temperature in the device of 60° C. and dried therein for 60 min in this state A, i.e. at least the surface of the grain of rice is also at this temperature during the drying in state A. The grains of rice are subsequently brought into a state B at a temperature in the device of 70° C. and dried therein for 60 min in this state B, i.e. at least the surface of the grain of rice is also at this temperature during the drying in state B. The grains of rice are thereupon brought into a state C at a temperature in the device of 80° C. and dried therein for 60 min in this state C, i.e. at least the surface of the grain of rice is also at this temperature during the drying in state C. The total drying time is therefore 180 min.

In the case of FIG. 2, grains of rice are brought into a state A at a temperature in the device of 90° C. and dried therein for 60 min in this state A. The grains of rice are subsequently brought into a state B at a temperature in the device of 60° C. and dried therein for 60 min in this state B. The total drying time is therefore 120 min.

The step of drying in state B serves to make the moisture uniform throughout the grain of rice. During the drying in state A, the surface of the grains of rice is dried to below a target moisture, although the surface remains in the viscoelastic state. The interior of the grain of rice has an elevated moisture relative to the surface moisture. A moisture gradient is therefore set up in the grain of rice. During the drying in state B, essentially no more moisture loss of the grain of rice to the surroundings takes place, i.e. the total moisture content of the grain of rice remains essentially constant. Moisture transport takes place from the interior of the grain of rice to the surface, until an equilibrium has been set up and, in particular, the desired target moisture has been achieved.

The invention claimed is:

1. A method for drying rice, in which, during the drying process, the grains of rice pass through surface states which have various pairs of the values of surface temperature and surface moisture, and wherein at least one subregion of the surface of the grains of rice remains during at least a part of the drying process in a viscoelastic state in which,
   a) the surface temperature of the grains of rice does not lie more than 40° C. above the surface temperature on a glass transition curve of the rice at the point of equal surface moisture; and/or
   b) the surface moisture of the grains of rice does not lie more than 20% above the moisture on the glass transition curve at the point of equal surface temperature, wherein the passage through the temperature/moisture states takes place with an increase of the surface temperature and a decrease of the surface moisture,
   wherein the transition to the glass range is prevented by controlling the relative humidity of the drying climate at each temperature during the drying process.

2. The method as claimed in claim 1, wherein the temperature and moisture of the surface of the grains of rice are controlled or regulated during the drying process so that the time requirement of the overall drying process is minimized.

3. The method as claimed in claim 1, wherein a glass transition curve in a diagram of temperature and moisture of the surface of the rice is used for the control or regulation of the method.

4. The method as claimed in claim 1, wherein the equilibrium moisture on the surface of the grains of rice is monitored during the drying.

5. The method as claimed in claim 1, wherein viscoelastic states through which the grains of rice pass during the drying process, in which the grains of rice have surface temperatures $(T_v)$ and surface moistures $(U_v)$, have minimum distances $\Delta U_{min}=U_v-U_g$ parallel to the moisture axis U, in a diagram of the temperature (T) and the moisture (U) of the surface of the grains of rice, from states at the glass transition with glass transition temperatures $(T_g)$ and glass transition moistures $(U_g)$, where $\Delta U_{min}$ satisfies: $0.5\%<\Delta U_{min}<5\%$.

6. The method as claimed in claim 1, wherein viscoelastic states through which the grains of rice pass during the drying process, in which the grains of rice have surface temperatures $(T_v)$ and surface moistures $(U_v)$, have minimum distances $\Delta T_{MIN}=T-T_g$ parallel to the temperature axis T, in a diagram of the temperature (T) and the moisture (U) of the surface of the grains of rice, from states at the glass transition with glass transition temperatures $(T_g)$ and glass transition moistures $(U_g)$, where $\Delta T_{MIN}$ satisfies: $1\text{ K}<\Delta T_{MIN}<10\text{ K}$.

7. The method as claimed in claim 1, wherein viscoelastic states through which the grains of rice pass during the drying process, in which the grains of rice have surface temperatures $(T_v)$ and surface moistures $(U_v)$, have maximum distances $\Delta U_{MAX}=U-U_g$ parallel to the moisture axis U, in a diagram of the temperature (T) and the moisture (U) of the surface of the grains of rice, from states at the glass transition with glass transition temperatures $(T_g)$ and glass transition moistures $(U_g)$, where $\Delta U_{MAX}$ satisfies: $5\%<\Delta U_{max}<20\%$.

8. The method as claimed in claim 1, wherein viscoelastic states through which the grains of rice pass during the drying process, in which the grains of rice have surface temperatures $(T_v)$ and surface moistures $(U_v)$, have maximum distances $\Delta T_{Max}=T-T_g$ parallel to the temperature axis T, in a diagram of the temperature (T) and the moisture (U) of the surface of the grains of rice, from states at the glass transition with glass transition temperatures $(T_g)$ and glass transition moistures $(U_g)$, where $\Delta T_{Max}$ satisfies: $10\text{ K}<\Delta T_{Max}<40\text{ K}$.

9. The method as claimed in claim 1, wherein the glass transition curve was/is determined by measurements on samples of the rice before and/or during the drying.

10. The method as claimed in claim 1, wherein the glass transition curve is taken or derived from a library of glass transition data and/or rice data.

11. The method as claimed in claim 1, wherein during at least a part of the drying process, the relative humidity of the drying environment and/or the temperature of the drying environment of the rice are controlled or regulated so that at least a subregion of the surface is not embrittled but remains in a viscoelastic state.

12. The method as claimed in claim 1, wherein the time integral of the temperature profile as a function of time in ° C. over the total drying time is less than $20\times10^3$ min ° C.

13. The method as claimed in claim 1, wherein during the drying process, the grains of rice are moved relative to one another and/or kept separated relative to one another.

14. The method as claimed in claim 1, wherein an equilibrium temperature and an equilibrium moisture are set up on the surfaces of the grains of rice, wherein the equilibrium temperature increases and the equilibrium surface moisture decreases during the drying process.

15. The method as claimed in claim 14, wherein the equilibrium moisture on the surfaces of the grains of rice is monitored during drying and used for controlling humidity and the temperature of the drying climate in such a way that the equilibrium temperature on the surfaces of the grains of rice increases and the equilibrium surface moisture on the surface of the grains of rice decreases during the drying process.

16. The method as claim in claim 1, wherein the temperature of the drying air increases during the drying process.

17. The method as claimed in claim 16, wherein the temperature of the drying air increases by at least 10° C. during the drying process.

18. The method as claimed in claim 17, wherein the temperature of the drying air increases by at least 20° C. during the drying process.

* * * * *